(12) United States Patent
Reynoso

(10) Patent No.: US 10,822,066 B1
(45) Date of Patent: Nov. 3, 2020

(54) AUTOMATIC VEHICLE DEPTH REGULATION SYSTEM

(71) Applicant: United States of America as represented by the Secretary of the Navy, Arlington, VA (US)

(72) Inventor: Bryan Reynoso, Ponte Vedra Beach, FL (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/521,011

(22) Filed: Jul. 24, 2019

(51) Int. Cl.
*B63G 8/24* (2006.01)
*B63G 8/22* (2006.01)
*G05D 1/00* (2006.01)

(52) U.S. Cl.
CPC ............... *B63G 8/24* (2013.01); *B63G 8/22* (2013.01); *G05D 1/0005* (2013.01)

(58) Field of Classification Search
CPC .......... B63G 8/24; B63G 8/22; G05D 1/0005
See application file for complete search history.

(56) References Cited

U.S. PATENT DOCUMENTS

| | | | | |
|---|---|---|---|---|
| 3,388,683 A * | 6/1968 | Barhite | ................... | B63C 11/44 114/325 |
| 3,716,009 A * | 2/1973 | Strickland | ................ | B63G 8/22 114/333 |
| 5,441,302 A * | 8/1995 | Johnson | ................ | B60R 21/264 222/3 |
| 5,713,299 A * | 2/1998 | Lopez Ibor Alino | ... | B63B 1/121 114/331 |
| 2013/0327263 A1 * | 12/2013 | Sparks | ................... | B63G 8/001 114/54 |
| 2019/0047879 A1 * | 2/2019 | Evans | .................... | C02F 1/441 |

* cited by examiner

*Primary Examiner* — Stephen P Avila
(74) *Attorney, Agent, or Firm* — James T. Shepherd

(57) ABSTRACT

An automatic depth regulation system uses changes in water pressure to automatically control the depth of an underwater vehicle. The system uses a piston chamber having a piston that is movably disposed within the chamber and mechanically linked to the vehicle's fins. The bottom of the piston is subjected to pressure from the ambient environment through which the vehicle travels. The chamber contains a compressible medium at a preselected pressure above the piston. A spring is also above the piston in the chamber. Changes in ambient pressure on the bottom of the piston causes the piston to move within the chamber, thereby rotating the fins to adjust the depth of the vehicle to the desired, preselected, depth. The desired depth is determined by the pressure and spring force exerted on the top of the piston in opposition to the ambient pressure.

19 Claims, 9 Drawing Sheets

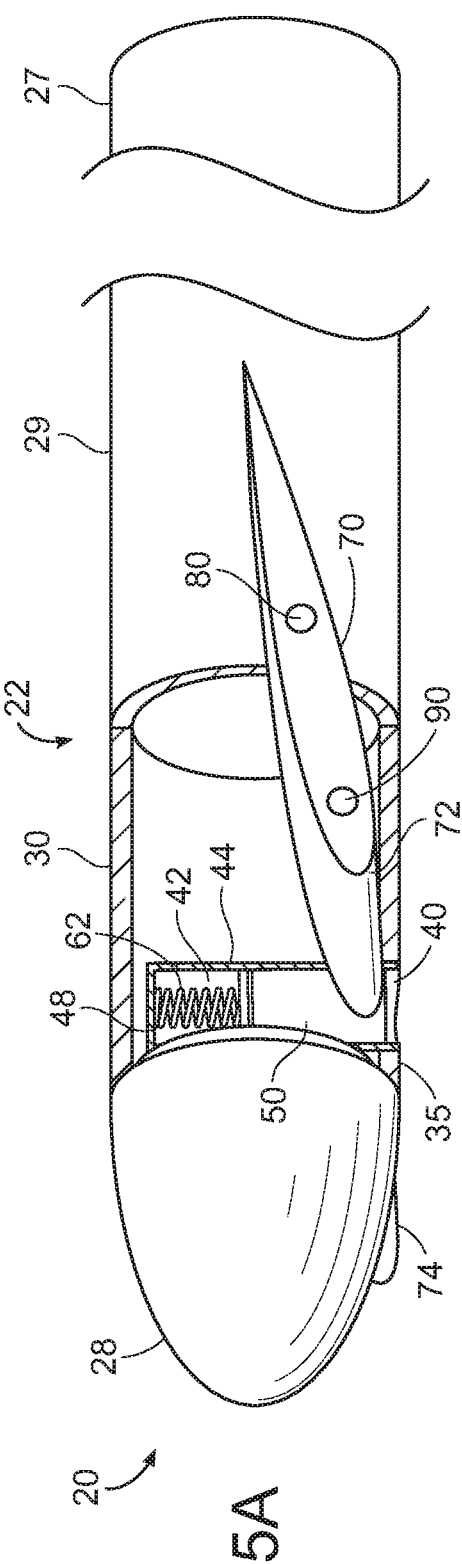
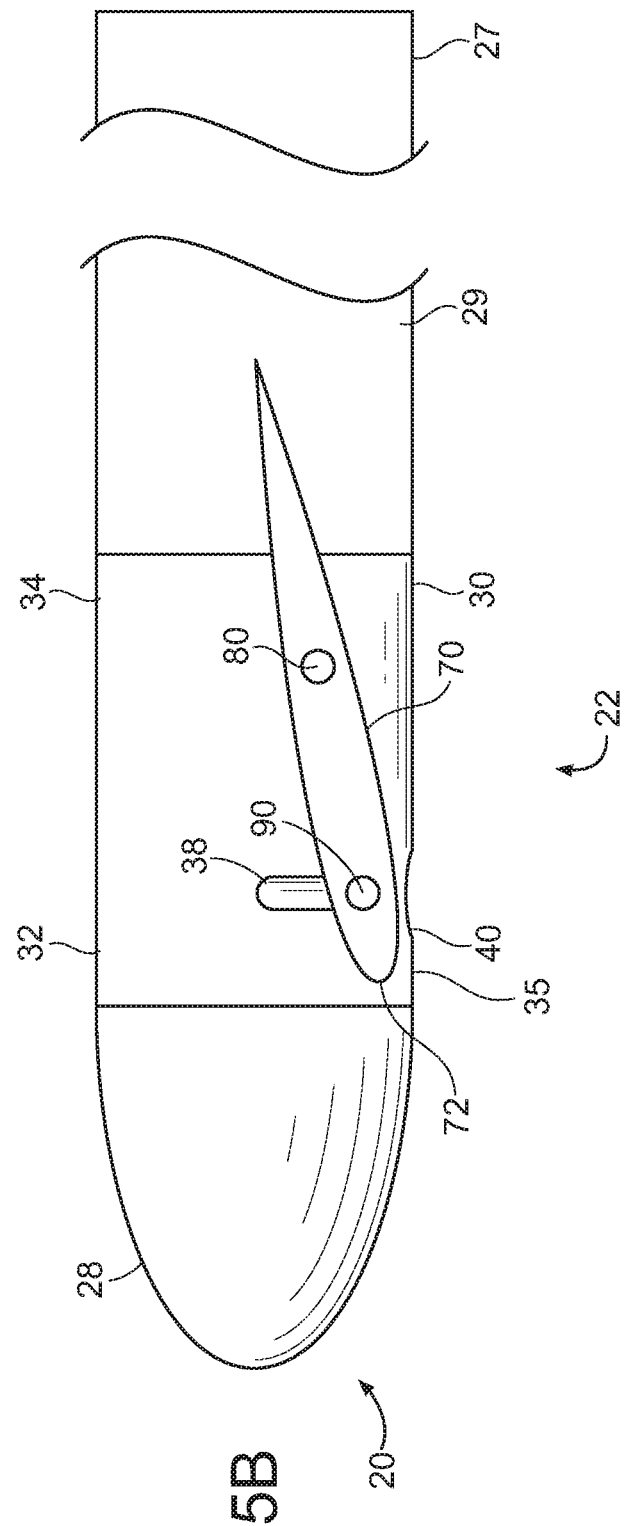

US 10,822,066 B1

AUTOMATIC VEHICLE DEPTH REGULATION SYSTEM

STATEMENT OF GOVERNMENT INTEREST

The invention described herein may be manufactured and used by or for the Government of the United States of America for governmental purposes without the payment of any royalties.

FIELD OF THE INVENTION

The present invention relates to an automatic vehicle depth regulation system. More specifically, the invention relates to a mechanical system for automatically maintaining a vehicle at a predetermined depth or altitude.

BACKGROUND

Conventional systems for regulating the depth of unmanned underwater vehicles, or the altitude of unmanned aerial vehicles, typically require electrical commands or a chemical reaction input in order to actuate the vehicle's control surfaces (e.g., fins or wings). For example, many conventional apparatuses utilize one or more servo motors and a computer or other microcontroller to generate control signals for the servo motors. In the case of unmanned underwater vehicles, such conventional apparatuses also include a depth measuring tool such as a depth sounder. The servo motor, computer, and depth sounder require electrical power which is typically supplied by an onboard power source such as a battery, a power storage capacitor, or a combination of both. The servo motor, computer, depth sounder and onboard power source add to the weight, cost and complexity of the vehicle.

What is needed is a new autonomous system that automatically adjusts the attitude of a vehicle's control surfaces to maintain the vehicle at a desired depth or altitude without the need for complex, heavy, and/or space-consuming components typically associated with conventional control systems.

SUMMARY OF THE INVENTION

Accordingly, it is an object of the present invention to provide a simple automatic mechanical system that utilizes changes in ambient pressure to adjust the control surfaces of a vehicle to maintain the vehicle depth without the need for electrical command signals, electro-mechanical, devices, or chemical reactions.

Other objects and advantages of the present invention will become more obvious hereinafter in the specification and drawings.

In one embodiment, an automatic depth regulation system for a vehicle comprises a hub section configured to be integrated into the body of a vehicle. The hub section has a longitudinally extending axis, a port side, a starboard side, a forward portion having a first pair of axially aligned openings therein wherein each opening is configured as a vertically oriented slot, a rear portion, and a bottom portion. The bottom portion of the hub section has an inlet that is exposed to the ambient environment.

A piston chamber is located within the hub section. The piston chamber has a chamber wall and an interior region. The chamber wall has a pair of diametrically positioned chamber openings that are aligned with the first pair of axially aligned openings in the forward portion of the hub section. The chamber openings are configured as vertically oriented slots like the first pair of axially aligned openings.

A piston is movably disposed within the interior region of the piston chamber such that the piston is movable in upward and downward directions. The piston has a top end, an opposite bottom end that is in communication with the ambient environment via the inlet, and a pair of diametrically positioned piston openings that are aligned with the pair of chamber openings in the chamber wall. A compressible medium at a preselected pressure is contained within the interior region of the chamber above the top end of the piston. In one embodiment, the piston includes a circumferentially extending groove and an O-ring seal is positioned within the groove to create a seal between the piston and the chamber wall. In alternate embodiments, the compressible medium can be air or a compressible fluid. In one embodiment, the system includes a port for providing the compressible medium to the interior region of the piston chamber at the preselected pressure.

A first shaft extends through the pair of piston openings, the pair of chamber openings, and the first pair of axially aligned openings. The first shaft has a port end that extends from the port side of the hub section and a starboard end that extends from the starboard side of the hub section. Vertical movement of the piston causes a corresponding vertical movement of the first shaft.

The preselected pressure of the compressible medium is chosen to exert a force on the top end of the piston that is equivalent to the opposing force exerted on the bottom end of the piston by the pressure of the ambient environment at a preselected vehicle depth. When the vehicle is above the preselected depth, the force of the ambient pressure on the bottom of the piston is less than the force of the compressible medium on the top of the piston, causing the piston to move downward within the piston chamber and thereby causing the first shaft to move downward. When the vehicle descends below the preselected depth, the force of the ambient pressure on the bottom of the piston exceeds the force of the compressible medium on the top of the piston, causing the piston to move upward within the piston chamber and thereby causing the first shaft to move upward.

In a typical embodiment, the automatic depth regulation system includes fins coupled to the first shaft. Specifically, a port fin has a forward section coupled to the port end of the first shaft and a rear section rotatably coupled to the vehicle. Similarly, a starboard fin has a forward section coupled to the starboard end of the first shaft and a rear section rotatably coupled to the vehicle. Thus, vertical movement of the piston and first shaft causes corresponding vertical movement of the fins, which causes them to rotate.

The rear portion of the hub section may contain a second pair of axially aligned openings. A second shaft extends through and is rotatably positioned within the second pair of axially aligned openings. The second shaft has a port end that extends from the port side of the hub section and a starboard end that extends from the starboard side of the hub section.

In another embodiment, the automatic depth regulation system further includes a spring disposed between the top end of the piston and the chamber wall. In this embodiment, the combined force of the spring and the preselected pressure of the compressible medium exert a force on the top of the piston that is equivalent to the opposing force exerted on the bottom of the piston by the pressure of the ambient environment at the preselected vehicle depth.

In yet another embodiment, an underwater vehicle has a body having a longitudinally extending axis, a port side, a starboard side, a bottom portion, and an inlet in said bottom portion. The body has a first pair of axially aligned openings that are configured as vertically oriented slots. The body has a piston chamber, piston, and first shaft similar to those in the embodiment described above. The underwater vehicle has a port fin having a forward section coupled to the port end of the first shaft and a rear section rotatably coupled to the port side of the body. It also has a starboard fin having a forward section coupled to the starboard end of the first shaft and a rear section rotatably coupled to the starboard side of the body.

The preselected pressure of the compressible medium is chosen to exert a force on the top end of the piston that is equivalent to the opposing force exerted on the bottom end of the piston by the pressure of the ambient environment at a preselected vehicle depth. When the vehicle is above the preselected depth, the force of the ambient pressure on the bottom of the piston is less than the force of the compressible medium on the top of the piston, causing the piston to move downward within the piston chamber and thereby causing the first shaft to move downward. This causes the forward sections of the port and starboard fins to move downward as the fins rotate, thereby causing the vehicle to descend. When the vehicle descends below the preselected depth, the force of the ambient pressure on the bottom of the piston exceeds the force of the compressible medium on the top of the piston, causing the piston to move upward within the piston chamber. This causes corresponding upward movements of the first shaft and the forward sections of the port and starboard fins, thereby causing the vehicle to ascend.

In one embodiment, the underwater vehicle includes a second pair of axially aligned openings in the body aft of the first pair of axially aligned openings and a second shaft extending through and rotatably positioned within the second pair of axially aligned openings. The second shaft also has a port end that extends from the port side of the vehicle and a starboard end that extends from the starboard side of the vehicle. In this embodiment, the rear portion of the port fin is coupled to the port end of this second shaft and the rear portion of the starboard fin is coupled to the starboard end of the second shaft. In an alternate embodiment, the second shaft may be fixed in the body and the rear portions of the port and starboard fins are rotatably attached to the respective port and starboard ends of the second shaft.

In one embodiment, the underwater vehicle includes a spring disposed between the top end of the piston and the chamber wall. In this embodiment, the combined force of the spring and the preselected pressure of the compressible medium exert a force on the top of the piston that is equivalent to the opposing force exerted on the bottom of the piston by the pressure of the ambient environment at the preselected vehicle depth.

The compressible medium in the underwater vehicle may be air or a compressible fluid. The chamber wall can include a port for providing the compressible medium to the interior region of the piston chamber at the preselected pressure. The piston can include a circumferentially extending groove with an O-ring seal positioned within the groove to create a seal between the piston and the chamber wall.

BRIEF DESCRIPTION OF THE DRAWINGS

FIG. 5A is a perspective view, partially in cross-section, of the vehicle, the view showing the interior of the hub section of the vehicle wherein the automatic depth regulation system is configured to position the fins so as to cause descent of the vehicle;

FIG. 5B is a left side elevational view of the vehicle wherein the automatic depth regulation system is configured to position the fins so as to cause descent of the vehicle;

DESCRIPTION OF EXEMPLARY
EMBODIMENTS OF THE INVENTION

Typically, the present invention would be used to regulate the depth of an autonomous underwater vehicle (AUV). However, it will become readily apparent that the invention could also be utilized in other vehicles, such as unmanned underwater vehicles and even unmanned or autonomous aerial vehicles. In view of this, it should be noted that references to "depth" throughout this specification and ensuing claims should be construed to mean a vehicle's depth below the waterline as well as a vehicle's altitude above ground, as appropriate, with the understanding that increases in vehicle depth below the waterline results in increases in ambient pressure and increases in vehicle altitude above the ground results in decreases in ambient pressure. Also, it should be understood that the terms "port," "starboard," "forward," "rear," and "aft," as used herein, have the meanings typically used in the art to denote the respective sides and ends of a watercraft and their associated directions.

Figure 1:
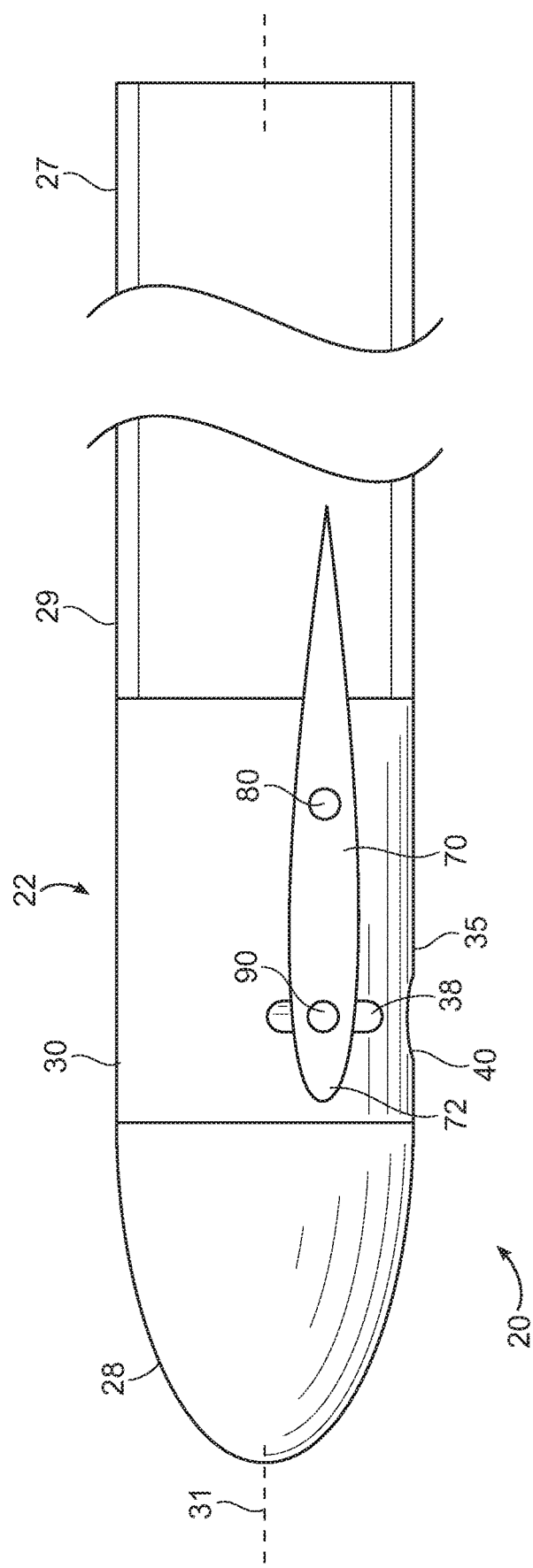
FIG. 1 is a partial, left side elevational view of an underwater vehicle utilizing the automatic depth regulation system of the present invention, wherein the automatic depth regulation system has configured the fins of the vehicle for depth maintenance.
Figure 2:
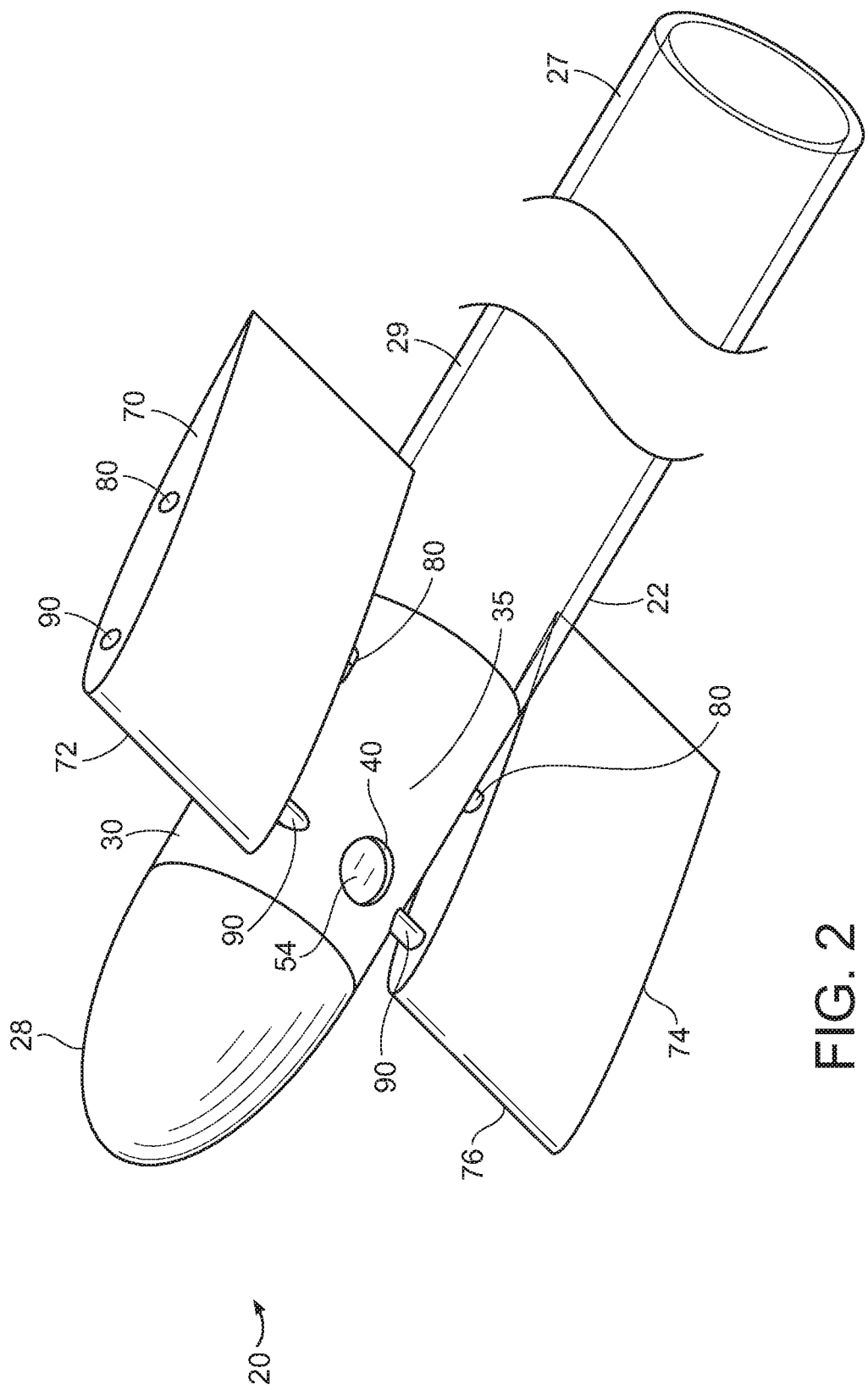
FIG. 2 is a bottom view, in perspective, of the vehicle.

FIGS. 1 and 2 show an underwater vehicle 20 that utilizes the automatic depth regulation system of the present invention. Exemplary vehicle 20 comprises body or hull 22 which has a port side and starboard side. Body 22 includes aft section 27 and a forward section comprising nose section 28 and hub section 30. Body 22 also includes a mid-section 29. Body 22 has a longitudinally extending axis 31. Vehicle 20 includes a propulsion system (not shown) that propels vehicle 20 through the water. Such propulsion systems are well known in the art and therefore are not described herein.

Figure 3A:
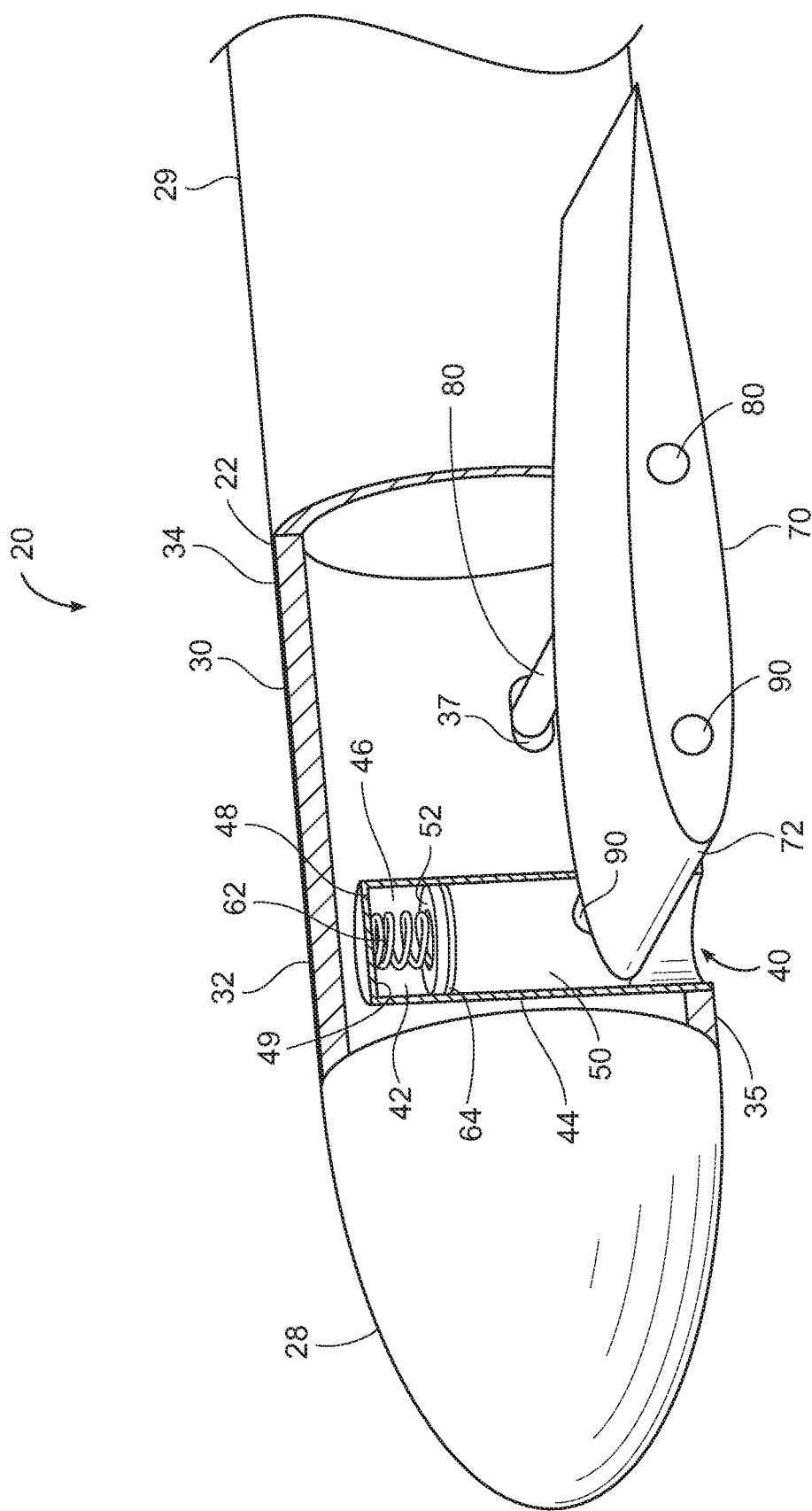
FIG. 3A is a perspective view, partially in cross-section, of the forward and middle sections of the vehicle, the view showing the interior of a hub section of the vehicle and the components of the automatic depth regulation system.
Figure 3B:
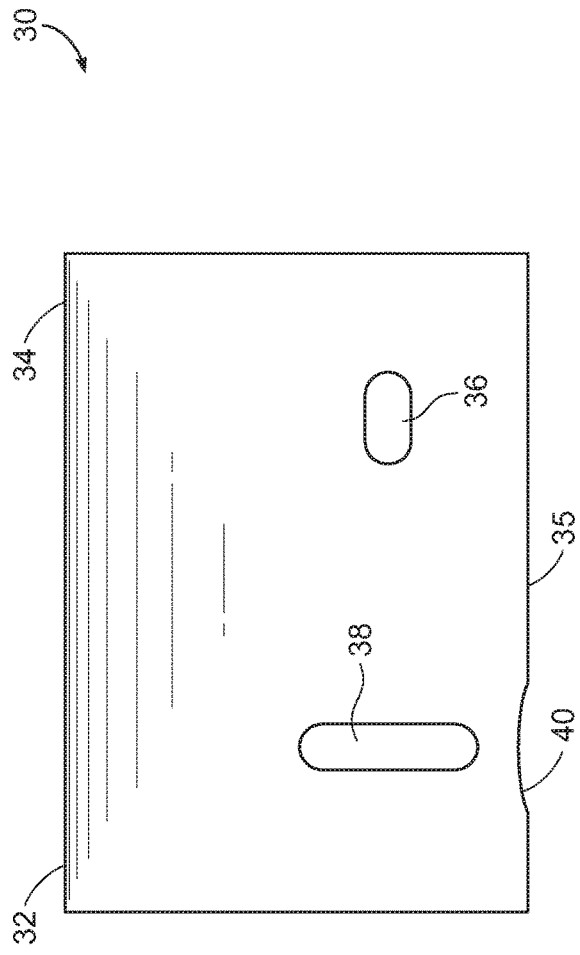
FIG. 3B is a left side elevational view of the hub section of the vehicle.
Figure 3C:
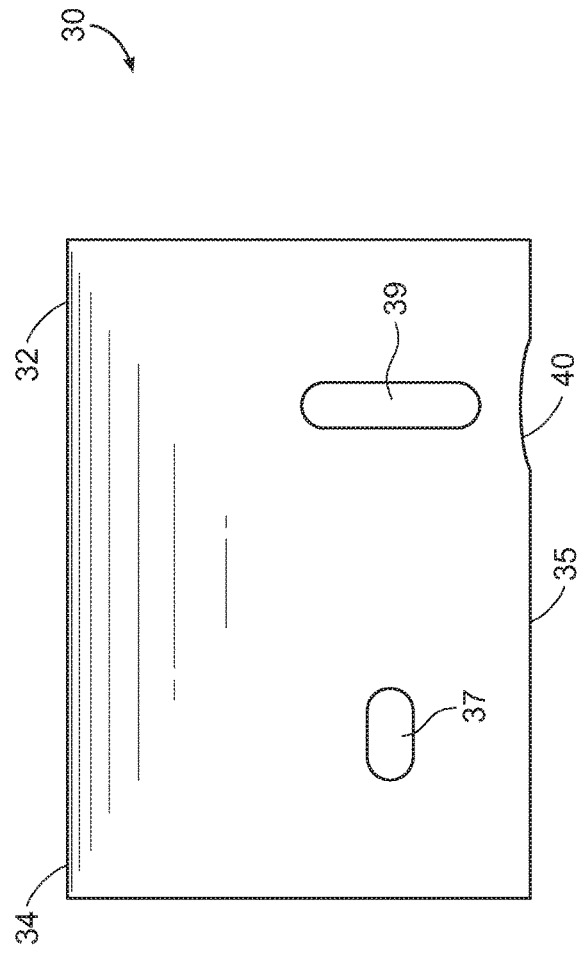
FIG. 3C is a right side elevational view of the hub section.
Figure 3D:
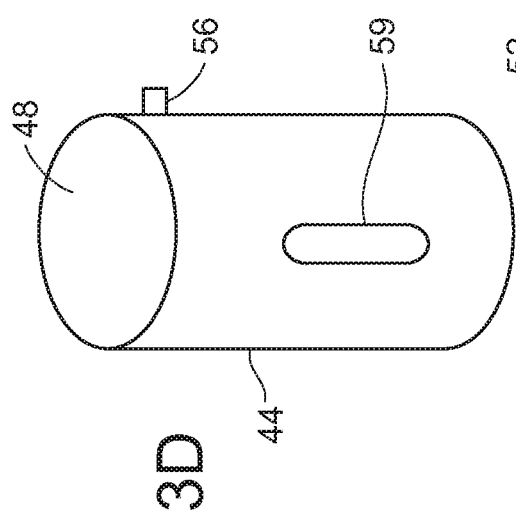
FIG. 3D is a perspective view of the piston chamber shown in FIG. 3A.

Referring to FIGS. 3A, 3B and 3C, hub section 30 includes forward portion 32, rear portion 34 and bottom portion 35. Hub section 30 includes a pair of axially aligned openings 36 and 37 in rear portion 34. In an exemplary embodiment, each axially aligned opening is configured as a horizontally oriented slot. Hub section 30 further includes axially aligned openings 38 and 39 in the forward portion 32. Each opening 38 and 39 is configured as a vertically oriented slot. Hub section 30 includes inlet 40 located in bottom portion 35.

Referring to FIGS. 3A-D, the automatic depth regulating system includes piston chamber 42 which is located within the interior of hub section 30. Piston chamber 42 comprises chamber wall 44 which defines an interior region 46. In an exemplary embodiment, chamber wall 44 is a single piece structure. Chamber wall 44 includes closed end 48 and an opposite open end (not shown) that is positioned directly over inlet 40. In an exemplary embodiment, the open end of chamber wall 44 is sealed to the interior wall of hub section 30 in order to prevent exterior water, fluid, or gases from seeping into the interior of hub section 30. Chamber wall 44 includes inner wall 49 that extends about interior region 46. The automatic depth regulation system includes piston 50 that is movably positioned within interior region 46. Piston 50 has top end 52 and bottom end 54 (shown in FIG. 2). The upper portion of interior region 46 contains a volume of a compressible medium, such as air. In one embodiment, the volume of air is injected or pumped into interior region 46 via port or air valve 56 that is attached to chamber wall 44 so that the air within interior region 46 is at a preselected pressure. In an alternate embodiment, interior region 46 is at atmospheric pressure and no additional air is injected or pumped into interior region 46, i.e., the air in the interior region 46 is left at the ambient atmospheric pressure at the time and location where the system is assembled or otherwise set up before a mission. In some embodiments, a gas other than air is pumped or injected into interior region 46.

In some embodiments, a compressible fluid is provided to the upper portion of interior region 46. In such embodiments, upward movement of piston 50 compresses the fluid and downward movement of piston 50 allows the fluid to expand.

Chamber wall 44 includes a pair of diametrically positioned openings, one of which being opening 59 (see FIG. 3D) and the other opening not being shown. Each opening in chamber wall 44 is configured as a substantially vertically oriented slot. The diametrically positioned slot-shaped openings in chamber wall 44 are aligned with the slot-shaped openings 38 and 39 in hub section 30.

Figure 3E:
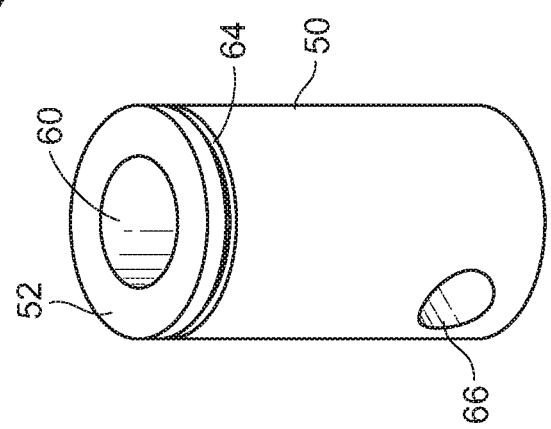
FIG. 3E is a perspective view of the piston shown in FIG. 3A.
Figure 3F:
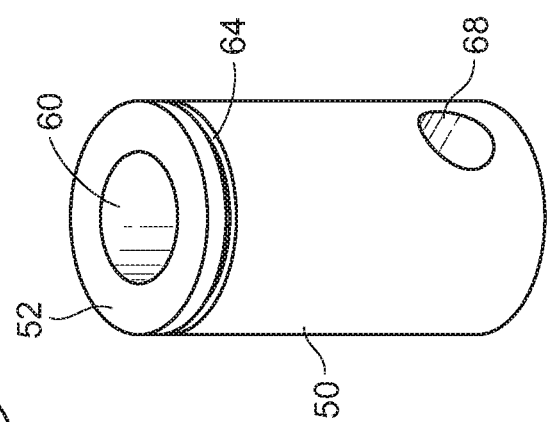
FIG. 3F is another perspective view of the piston.

Referring to FIGS. 3E and 3F, piston 50 includes seat 60 in top end 52 which is sized to receive an end of spring 62. Spring 62 is described in detail in the ensuing description. Piston 50 also includes a circumferentially extending groove that is sized to receive O-ring seal 64. O-ring seal 64 creates a water-tight or gas-tight seal between piston 50 and the interior walls of chamber wall 44 so as to prevent water from seeping into the upper portion of interior region 46 where spring 62 is located and to prevent leakage of air between piston 50 and inner wall 49 of chamber wall 44. Piston 50 includes a pair of diametrically positioned openings or through-holes 66 and 68. The diametrically positioned openings 66 and 68 are aligned with the diametrically positioned slot-shaped openings in chamber wall 44 which, as stated in the foregoing description, are aligned with the slot-shaped openings 38 and 39 of hub section 30.

The automatic depth regulating system further includes spring 62 which is interposed between top end 52 of piston 50 and closed end 48 of chamber wall 44. The bottom end of spring 62 is positioned within seat 60 formed in the top end 52 of piston 50. Spring 62 exerts a relatively low-magnitude force on piston 50 which facilitates smooth upward and downward movement of piston 50. Spring 62 has a predetermined stiffness which produces the desired force on piston 50. In an exemplary embodiment, spring 62 is configured as a steel compression spring. Bottom end 54 of piston 50 is subjected to the ambient water pressure 41 at inlet 40 (see FIG. 4). When the force of the water pressure 41 on bottom end 54 becomes greater than the combined force exerted on the top end 52 by the pressure within piston chamber 42 and the force produced by spring 62, piston 50 will move upward. When the force of the water pressure 41 on bottom end 54 becomes less than the combined force exerted on the top end 52 by the pressure within piston chamber 42 and the force produced by spring 62, piston 50 will move downward.

Referring to FIGS. 1-5B, vehicle 20 includes a control surface, or fin, 70 on the port side which has leading edge 72. Vehicle 20 further includes starboard fin 74 which has leading edge 76. An elongate shaft 90 extends through openings 38 and 39 in hub section 30, through the pair of diametrically positioned openings (e.g. opening 59) in chamber wall 44, and through openings 66 and 68 in piston 50. In a typical embodiment, shaft 90 is positioned transverse to longitudinally extending axis 31. Shaft 90 is coupled to fins 70 and 74. Specifically, the port end of shaft 90 extends from the port side of hub section 30 and is coupled to the forward section of port fin 70. The starboard end of shaft 90 extends from the starboard side of hub section 30 and is coupled to the forward section of starboard fin 74. Fins 70 and 74 may be affixed to shaft 90 or rotatably coupled to shaft 90.

Another elongate shaft 80 extends through the axially aligned openings 36 and 37 in rear portion 34 of hub section 30. In a typical embodiment, shaft 80 is positioned transverse to longitudinally extending axis 31 and is substantially parallel to shaft 90. The port end of shaft 80 extends from the port side of hub section 30 and is attached to the rear section of port fin 70. The starboard end of shaft 80 extends from the starboard side of hub section 30 and is attached to the rear section of starboard fin 74. In the illustrated embodiment, shaft 80 is rotatable thereby allowing fins 70 and 74 to pivot. Hence, shaft 80 defines or provides an axis about which fins 70 and 74 pivot. Shaft 80 may be made from any suitable materials, including plastic, PVC (polyvinylchloride), rubber, wood, metal, etc. In an exemplary embodiment, shaft 80 comprises a PVC tube. In some embodiments, shaft 80 comprises a metal pipe or shaft.

Figure 4:
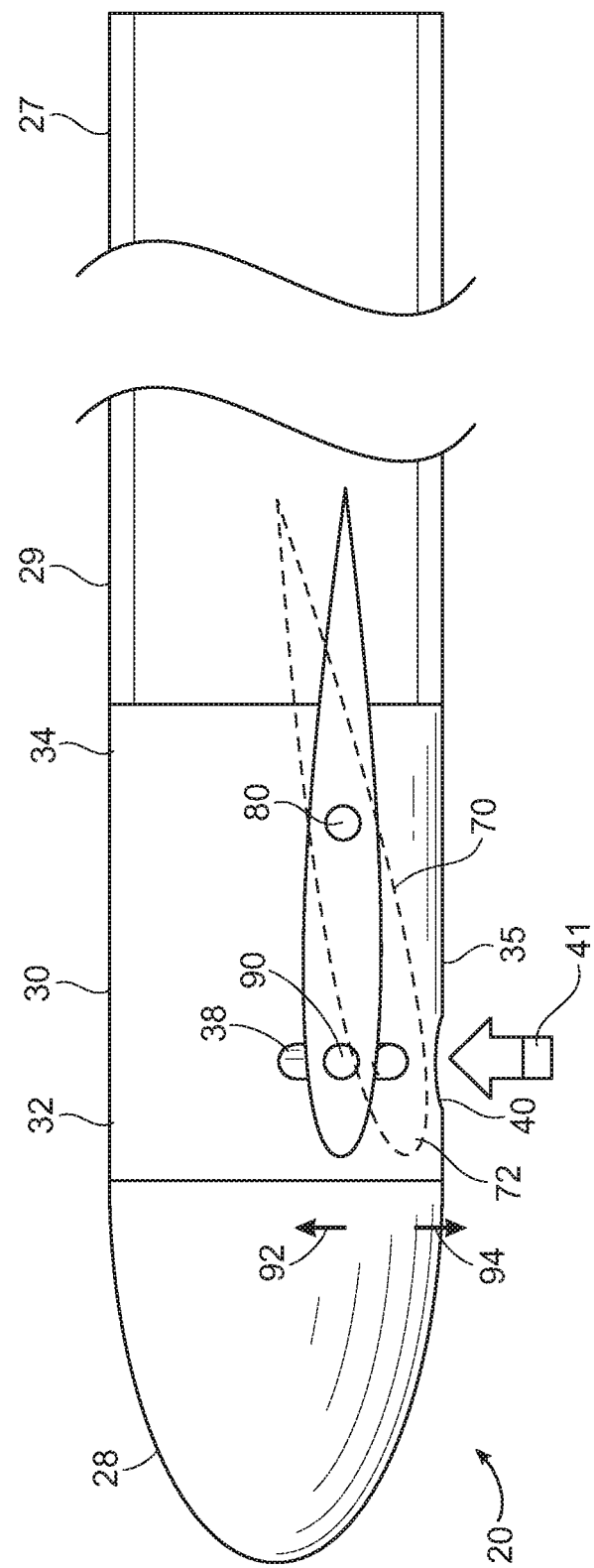
FIG. 4 is a partial, left side elevational view of the vehicle illustrating movement of the fins between a depth maintenance position and an actuated position for causing descent of the vehicle.
Figure 6A:
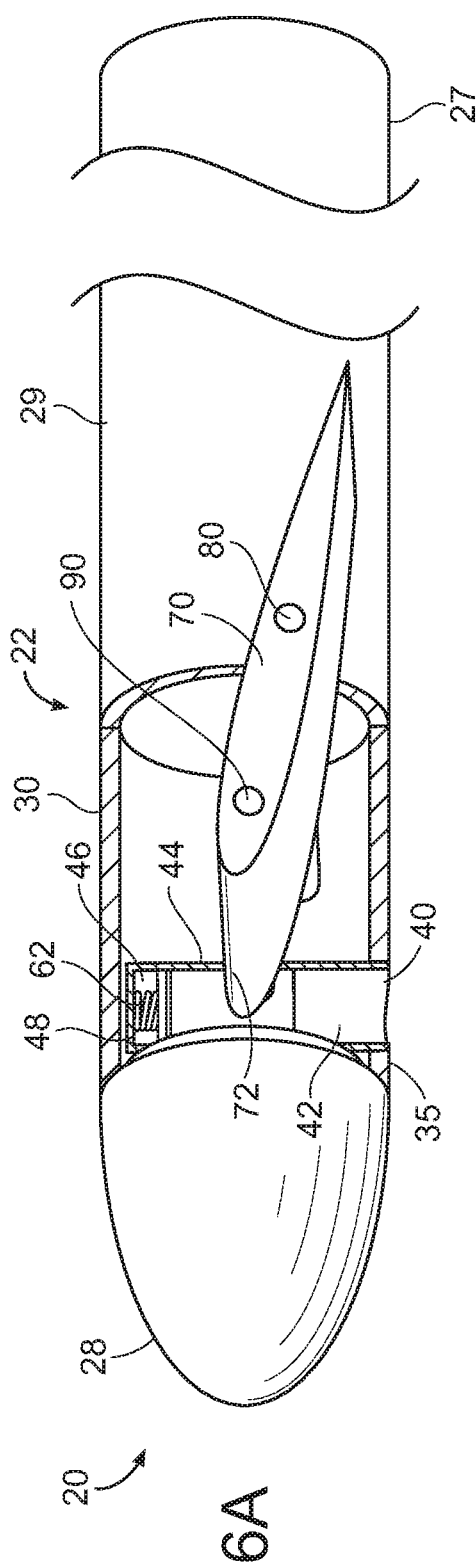
FIG. 6A is a perspective view, partially in cross-section, of the vehicle, the view showing the interior of the hub section wherein the automatic depth regulation system is configured to position the fins so as to cause ascent of the vehicle.
Figure 6B:
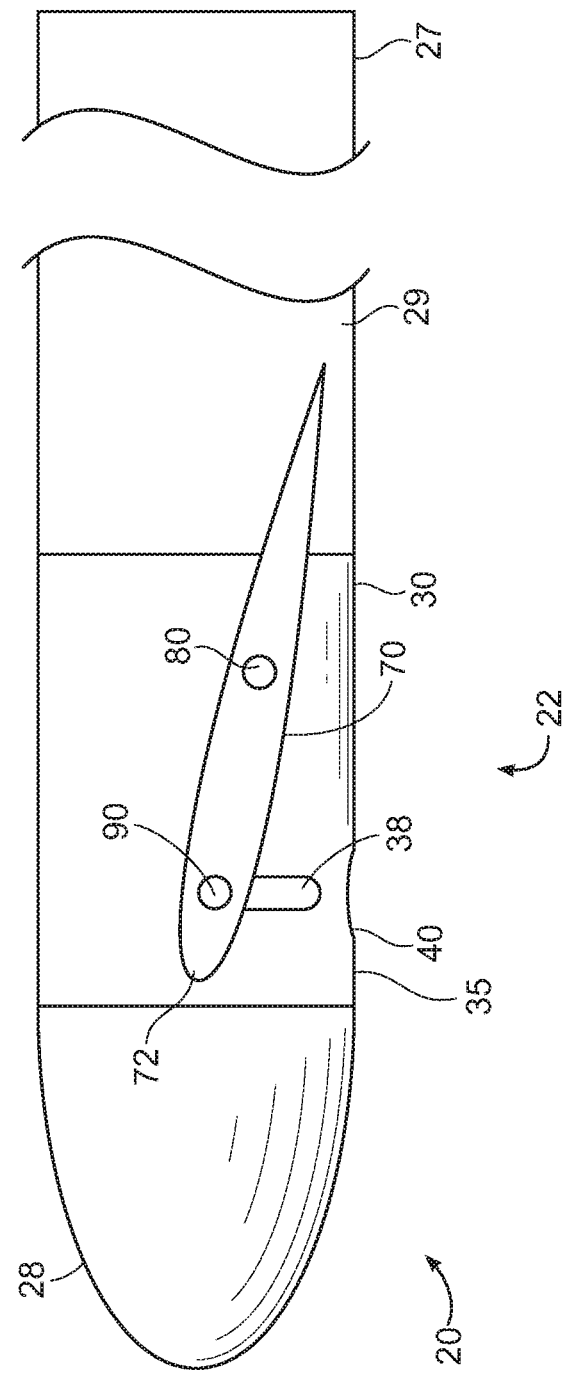
FIG. 6B is a left side elevational view of the vehicle wherein the automatic depth regulation system is configured to position the fins so as to cause ascent of the vehicle.

In this configuration, upward or downward movement of piston 50 causes fins 70 and 74 to pivot upward or downward as indicated by arrows 92 and 94 shown in FIG. 4. Specifically, upward movement of piston 50 causes fins 70 and 74 to pivot about shaft 80 in an upward direction as shown in FIGS. 6A and 6B. Downward movement of piston 50 causes fins 70 and 74 to pivot about shaft 80 in a downward direction as shown in FIGS. 4, 5A and 5B. The surface area of bottom end 54 of piston 50, the water pressure on bottom end 54, the stiffness of spring 62 and the pressure of the gas or fluid within interior region 46 cooperate to determine the actual distance piston 50 will move upward or downward for a given water depth. A state of equilibrium is achieved when the magnitude of the force of the water pressure at bottom end 54 of piston 50 is substantially equal to the total force produced by the pressure within interior region 46 of piston chamber 42 and the force produced by spring 62. When equilibrium has been attained, fins 70 and 74 are positioned for depth maintenance so as to maintain vehicle 20 at a predetermined depth as shown in FIG. 1. During equilibrium, leading edges 72 and 76 of fins 70 and 74, respectively, point in a direction that is substantially parallel to longitudinally extending axis 31 of vehicle body 22.

In a typical mission for an unmanned underwater vehicle, vehicle 20 is initially deployed on the surface of the water. The user or operator orients fins 70 and 74 downward so as to cause vehicle 20 to dive as soon as the propulsion system is activated. Note that, when this specification refers to orienting or moving the fins 70 and 74 "downward" or "upward," or "lowering" or "raising" the fins, what is meant is that the respective leading edges 72 and 76 of the fins are moved downward or upward, respectively, causing the fins to rotate in the desired direction to make vehicle 20 dive or ascend. Spring 62 facilitates the determination of a starting location for piston 50. A specific amount of air or other gas or fluid is injected or pumped into interior region 46 of piston chamber 42 via port or air valve 56. This specific amount of gas or fluid creates an initial downward orientation of fins 70 and 74. Thus, when the propulsion system is activated, vehicle 20 dives underwater. As the depth of vehicle 20 increases, water pressure 41 on bottom end 54 of piston 50 increases. When the force of the water pressure 41 at bottom end 54 becomes greater than the total force produced by the pressure within piston chamber 42 and the spring 62, piston 50 moves upward. Upward movement of piston 50 raises fins 70 and 74, thereby causing vehicle 20 to ascend. As vehicle 20 ascends, water pressure 41 on bottom end 54 begins to decrease. When the force of water pressure 41 on bottom end 54 becomes less than the total force produced the pressure within piston chamber 42 and spring 62, piston 50 moves downward, thereby moving fins 70 and 74 downward and causing vehicle 20 to descend. The process of raising and lowering fins 70 and 74 will cause vehicle 20 to travel in a generally sinusoidal pattern until a rough pressure equilibrium is attained wherein the force of water pressure 41 is approximately the same as the opposing total force produced by the pressure within piston chamber 42 and spring 62. Once this rough equilibrium is attained, vehicle 20 will travel through the water in a substantially stable pattern such that the operating depth of vehicle 20 is held within a predetermined margin.

The desired operational depth of vehicle 20 can be adjusted by varying the initial pressure within the interior region 46 of piston chamber 42, and/or using a spring 62 with a different degree of stiffness, and/or changing the surface area of bottom end 54 of piston 50.

The automatic depth regulation system of the present invention is entirely autonomous, does not require any stored electrical power, and does not use any electrical components or servo motors to operate the fins, thereby conserving energy and lowering operational costs. The low component count of the automatic depth regulation system also occupies less space within the interior of vehicle 20 and reduces the weight of vehicle 20 thereby extending the operating time of vehicle 20. The extension of the operating time of vehicle 20 allows the vehicle to be used for longer voyages and missions and also enables the vehicle to accomplish multiple tasks on a single voyage.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described. For example, there are several alternative arrangements for the shaft 80 and fins 70 and 74 that can also be employed other than as illustrated herein without departing from the scope of the invention. For example, instead of fixing the fins 70, 74 to the shaft 80 and having the shaft rotatable, the shaft may be fixed in place and the fins rotatably attached to the shaft using methods known in the art. In another possible embodiment, instead of having one continuous shaft 80 that extends through the interior of hub section 30, two independent (fixed or rotatable) shafts may extend from opposite sides of the hub section 30 or a different portion of vehicle 20. In short, any of a variety of methods known in the art may be used to rotatably attach the fins to the body of the vehicle. Hub section 30 may be a distinct section of the vehicle 20 or the components described herein may be seamlessly integrated into the body 22 of an existing vehicle.

In other embodiments, spring 62 may be omitted from the piston chamber 42. In these embodiments, the initial pressure of the gas or fluid in chamber 42 provides the total force within the chamber that determines the equilibrium depth of the vehicle, i.e., the desired depth is maintained when the force of the ambient pressure on the bottom of piston 50 is equivalent to the force of the pressure in chamber 42 on the top of piston 50.

Figure 7:
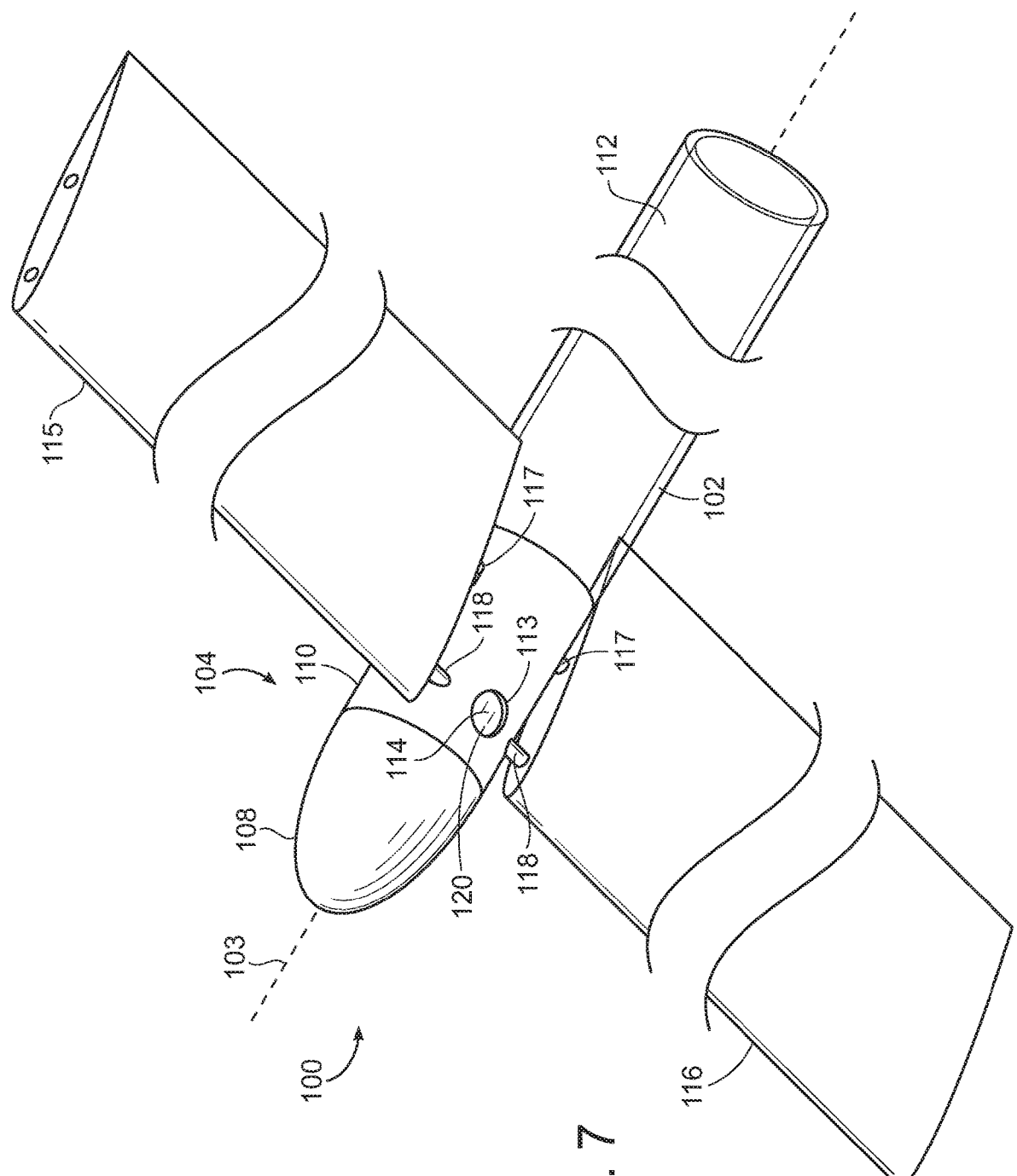
FIG. 7 is a bottom view, in perspective, of a portion of an autonomous aerial vehicle in accordance with another exemplary embodiment of the present invention.

The present invention may also be used in aerial vehicles, such as autonomous aerial vehicles (AAVs) and remotely operated aerial drones, in order to regulate the operational altitude of the vehicle. Referring to FIG. 7, there is shown an AAV 100 that incorporates the present invention in order to regulate the operational altitude of the AAV. AAV 100 includes body 102 which has a longitudinally extending axis 103. Body 102 comprises forward section 104. Forward section 104 includes nose section 108 and hub section 110. Body 102 further includes mid-section 112 and an aft section (not shown). Hub section 110 has substantially the same geometrical structure as hub section 30 described in the foregoing description. Hub section 110 includes air inlet 113 that is in the bottom portion of hub section 110. AAV 100 includes a piston chamber (not shown) that has the same function and structure as piston chamber 42 in vehicle 20 and which includes a piston chamber wall and piston 114. Piston 114 has the same purpose and function as piston 50 described above. A spring (not shown) may be interposed between the top end of piston 114 and the inner wall of the piston chamber. A predetermined volume of air or gas is provided to the piston chamber and has the same purpose as the volume of air or gas within piston chamber 42 of vehicle 20 described above. In some embodiments, a compressible fluid is provided to the piston chamber such that the fluid is compressed upon upward movement of piston 114 and the fluid expands upon downward movement of piston 114. AAV 100 includes port wing 115 and starboard wing 116. Shaft 117 extends through hub section 110 and is joined or attached to the rear portions of wings 115 and 116. Shaft 117 provides the same function as shaft 80 described in the foregoing description with respect to vehicle 20. Shaft 118 extends through hub section 110, the piston chamber wall and piston 114 and is attached or joined to the forward portions of wings 115 and 116. Shaft 118 provides the same function as shaft 90 described in the foregoing description with respect to vehicle 20. Since the medium through which the AAV travels is air, it is atmospheric air pressure upon bottom end 120 of piston 114 that will determine the position and movement of piston 114. Bottom end 120 of piston 114 is subject to the atmospheric pressure at inlet 113. Upward and downward movement of piston 114 causes corresponding upward and downward movements of wings 115 and 116.

Prior to take-off, wings 115 and 116 are initially raised so as to allow the AAV to gain altitude after take-off. This may be accomplished by setting the pressure of the gas or fluid in the piston chamber at a value less than the ambient atmospheric pressure at the launching location (e.g., at sea level or ground level), or by using a spring that is biased to pull piston 114 upward into the piston chamber. As AAV 100 gains altitude, the air pressure on bottom end 120 of piston 114 decreases. When the force of the atmospheric pressure on bottom end 120 becomes less than the total force produced by the pressure within the piston chamber and the force exerted by the spring, such a difference in force causes piston 114 to move downward. Downward movement of piston 114 lowers the leading edges of wings 115 and 116 thereby causing AAV 100 to descend. As AVV 100 descends, the air pressure on bottom end 120 of piston 114 begins to increase. When the force of the air pressure on bottom end 120 becomes greater than the total force produced by the pressure within the piston chamber and the force exerted by the spring, such a difference in force causes piston 114 to move upward. Upward movement of piston 114 raises wings 115 and 116 so as to cause AAV 100 to ease out of the descent and begin an ascent. As for vehicle 20, this process is repeated until a rough equilibrium is achieved wherein the force of the atmospheric pressure at bottom end 120 of piston 114 is approximately the same as the combined forces of the pressure within the piston chamber and the force exerted by the spring. Once this rough equilibrium is attained, AAV 100 will fly in a substantially stable pattern such that the operating altitude of AAV 100 is held within a predetermined margin. The desired operational altitude of AAV 100 can be adjusted by varying the initial pressure within the piston chamber and/or by using a spring with a different degree of stiffness and/or by changing the surface area of bottom end 120 of piston 114.

In some embodiments, AAV 100 may have a single wing that extends through body 102 instead of separate wings 115 and 116. In such embodiments, upward movement of piston 114 pivots the single wing upward and downward movement of piston 114 pivots the single wing downward. In other embodiments, each wing 115 and 116 may have a flap that is movably attached to the wing. In such embodiments, upward movement of piston 114 pivots the flaps upward and downward movement of piston 114 pivots the flaps downward.

The foregoing description, for purpose of explanation, refers to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An automatic depth regulation system for a vehicle, comprising:

a hub section configured to be integrated into the body of a vehicle, the hub section having
   a longitudinally extending axis,
   a port side,
   a starboard side,
   a forward portion having a first pair of axially aligned openings therein wherein each opening is configured as a vertically oriented slot,
   a rear portion,
   a bottom portion, and
   an inlet in said bottom portion that is exposed to the ambient environment;

a piston chamber located within said hub section, said piston chamber comprising a chamber wall and an interior region, said chamber wall having a pair of diametrically positioned chamber openings that are aligned with said first pair of axially aligned openings, wherein each of said chamber openings is configured as a vertically oriented slot;

a piston movably disposed within said interior region such that said piston is movable in an upward direction and a downward direction, said piston having a top end, an opposite bottom end that is in communication with the ambient environment via said inlet, and a pair of diametrically positioned piston openings that are aligned with said pair of chamber openings;

a compressible medium contained within said interior region above said top end of said piston, said medium being at a preselected pressure; and a first shaft extending transversely to said longitudinally extending axis and through said pair of piston openings, said pair of chamber openings, and said first pair of axially aligned openings, said first shaft having a port end that extends from said port side of said hub section and a starboard end that extends from said starboard side of said hub section, whereby vertical movement of said piston causes a corresponding vertical movement of said first shaft;

wherein said preselected pressure of said compressible medium is chosen to exert a force on said top end of said piston that is equivalent to the opposing force exerted on said bottom end of said piston by the pressure of the ambient environment at a preselected vehicle depth.

2. The automatic depth regulation system of claim 1, further comprising:

a port fin having a forward section coupled to said port end of said first shaft and a rear section configured to be rotatably coupled to the vehicle; and a starboard fin having a forward section coupled to said starboard end of said first shaft and a rear section configured to be rotatably coupled to the vehicle;

whereby vertical movement of said piston and said first shaft causes said port and starboard fins to rotate.

3. The automatic depth regulation system of claim 1, further comprising:

a second pair of axially aligned openings in said rear portion; and a second shaft extending transversely to said longitudinally extending axis and through and rotatably positioned within said second pair of axially aligned openings, said second shaft having a port end that extends from said port side of said hub section and a starboard end that extends from said starboard side of said hub section.

4. The automatic depth regulation system of claim 3, further comprising:

a port fin having a forward section coupled to said port end of said first shaft and a rear section coupled to said port end of said second shaft; and a starboard fin having a forward section coupled to said starboard end of said first shaft and a rear section coupled to said starboard end of said second shaft;

whereby vertical movement of said piston and said first shaft causes said port and starboard fins to rotate about said second shaft.

5. The automatic depth regulation system of claim 1, further comprising a spring disposed between said top end of said piston and said chamber wall, and wherein the combined force of said spring and said preselected pressure of said compressible medium exert a force on said piston that is equivalent to the opposing force exerted on said piston by the pressure of the ambient environment at a preselected vehicle depth.

6. The automatic depth regulation system of claim 1 wherein said compressible medium is air.

7. The automatic depth regulation system of claim 1 wherein said compressible medium is a compressible fluid.

8. The automatic depth regulation system of claim 5 wherein said compressible medium is air.

9. The automatic depth regulation system of claim 5 wherein said compressible medium is a compressible fluid.

10. The automatic depth regulation system of claim 1 wherein said chamber wall includes a port for providing said compressible medium to said interior region at said preselected pressure.

11. The automatic depth regulation system of claim 1 wherein said piston includes a circumferentially extending groove and further comprising an O-ring seal positioned within said groove to create a seal between said piston and said chamber wall.

12. An underwater vehicle, comprising:
a body having a longitudinally extending axis, a port side, a starboard side, a bottom portion, and an inlet in said bottom portion, said body having a first pair of axially aligned openings wherein each opening is configured as a vertically oriented slot;

a piston chamber located within said body, said piston chamber comprising a chamber wall and an interior region, said chamber wall having a pair of diametrically positioned chamber openings that are aligned with said first pair of axially aligned openings, wherein each of said chamber openings is configured as a vertically oriented slot;

a piston movably disposed within said interior region such that said piston is movable in an upward direction and a downward direction, said piston having a top end, an opposite bottom end that is in communication with the ambient environment via said inlet, and a pair of diametrically positioned piston openings that are aligned with said pair of chamber openings;

a compressible medium contained within said interior region above said top end of said piston, said medium being at a preselected pressure;

a first shaft extending transversely to said longitudinally extending axis and through said pair of piston openings, said pair of chamber openings, and said first pair of axially aligned openings, said first shaft having a port end that extends from said port side and a starboard end that extends from said starboard side, whereby vertical movement of said piston causes a corresponding vertical movement of said first shaft;

a port fin having a forward section coupled to said port end of said first shaft and a rear section rotatably coupled to said port side of said body aft of said front shaft; and a starboard fin having a forward section coupled to said starboard end of said first shaft and a rear section rotatably coupled to said starboard side of said body aft of said first shaft;

wherein vertical movement of said piston and said first shaft causes said port and starboard fins to rotate; and wherein said preselected pressure of said compressible medium is chosen to exert a force on said top end of said piston that is equivalent to the opposing force exerted on said bottom end of said piston by the pressure of the ambient environment at a preselected vehicle depth.

13. The underwater vehicle of claim 12, further comprising a spring disposed between said top end of said piston and said chamber wall, and wherein the combined force of said spring and said preselected pressure of said compressible medium exert a force on said piston that is equivalent to the opposing force exerted on said piston by the pressure of the ambient environment at a preselected vehicle depth.

14. The underwater vehicle of claim 12 wherein said compressible medium is air.

15. The underwater vehicle of claim 13 wherein said compressible medium is air.

16. The underwater vehicle of claim 12 wherein said chamber wall includes a port for providing said compressible medium to said interior region at said preselected pressure.

17. The underwater vehicle of claim 12 wherein said piston includes a circumferentially extending groove and further comprising an O-ring seal positioned within said groove to create a seal between said piston and said chamber wall.

18. The underwater vehicle of claim 12, further comprising:
a second pair of axially aligned openings in said body aft of said first pair of axially aligned openings; and a second shaft extending transversely to said longitudinally extending axis and through and rotatably positioned within said second pair of axially aligned openings, said second shaft having a port end that extends from said port side and a starboard end that extends from said starboard side;

wherein said rear portion of said port fin is coupled to said port end of said second shaft and said rear portion of said starboard fin is coupled to said starboard end of said second shaft.

19. The underwater vehicle of claim 18, further comprising a spring disposed between said top end of said piston and said chamber wall, and wherein the combined force of said spring and said preselected pressure of said compressible medium exert a force on said piston that is equivalent to the opposing force exerted on said piston by the pressure of the ambient environment at a preselected vehicle depth.

\* \* \* \* \*